Jan. 1, 1957 R. HAMPTON 2,776,006
DEVICE FOR SEVERING LENGTHS OF DRAWN STOCK
Filed March 30, 1954 3 Sheets-Sheet 1

Inventor
Ronald Hampton
By Scrivener + Parker
Attorneys

Jan. 1, 1957   R. HAMPTON   2,776,006
DEVICE FOR SEVERING LENGTHS OF DRAWN STOCK
Filed March 30, 1954   3 Sheets-Sheet 3

Inventor
Ronald Hampton
By Scrivener & Parker
Attorneys

United States Patent Office 2,776,006
Patented Jan. 1, 1957

2,776,006

DEVICE FOR SEVERING LENGTHS OF DRAWN STOCK

Ronald Hampton, Wightwick, near Wolverhampton, England, assignor to Patents and Investments Limited, Wolverhampton, England Application March 30, 1954, Serial No. 419,833

4 Claims. (Cl. 164—68)

This invention relates to draw-benches, and has for its object to provide an attachment for a draw-bench whereby the production of lengths of drawn stock can be accomplished economically, besides procuring further advantages which will appear hereafter.

The normal process in the production of wire rods, of the order of a half-an-inch and less, and as opposed to bench-drawing, is to draw from a single coil of black rolled wire at high speed through a die of the required aperture and on to a drum which re-coils the wire, this bright coil being then cut by machine into lengths, as may be required, and said lengths straightened ready for use. Hitherto, the relatively slow rate of production of which a draw-bench is capable, as compared with the specialised trade of wire-drawing, has confined the production of drawn lengths to the specialist factories, but the present invention places in the hands of bright steel drawers an attachment for their draw-benches which will enable them to produce, economically, wire rods from coils, without additional machines.

According to the present invention, a draw-bench is provided with an attachment for severing drawn lengths of stock, said attachment comprising at least one pair of counter-rotating spindles provided with at least one pair of co-acting cutter blades which reach a position of confronting edge-to-edge relationship during each revolution of the spindles, the attachment being mounted adjacent and immediately in front of the draw-bench die plate and the arrangement being such that the spindles can be counter-rotated to cause the cutter blades to bite into a work-piece passing between them, on opposite sides thereof, and commence a cut whilst inclined against the direction of draw, drawing movement of the work-piece effecting continued rotation of the spindles and cutter blades to cause the latter to reach their position of confronting edge-to-edge relationship and sever the work-piece.

Preferably the cutting attachment will be mounted for movement toward the die plate from a positively located position, so as to allow the forward end portion of the remainder of the work-piece to be made readily available for gripping by the dogging wagon. Otherwise it would be necessary to ensure sufficient clearance between the spindles for the gripping jaws of the dogging wagon to have access to the forward ends of the work-pieces, which ends, after severing of a length, lie between said spindles.

The attachment may be mounted in guides for longitudinal movement toward and away from the die-plate, a fully forward operative position of the attachment being defined by stops, which are retractable to allow the dogging wagon to pass them.

The cutting attachment may comprise a housing in which are mounted one or more pairs of co-acting cutter blades, the cutter blades in each pair being carried respectively by one of a pair of spindles journalled in said housing in parallel relationship and geared together for counter-rotation relative to each other, each cutter blade projecting radially from its spindle with its cutting edge disposed longitudinally thereof, and means being provided for counter-rotating the cutter blade spindles, the attachment being adapted for mounting on a draw-bench adjacent and immediately in front of the die-plate so that a work-piece can be passed between the, or each, pair of cutter blades.

Two embodiments of the invention will now be described with reference to the accompanying drawings, in which.

Figure 1:
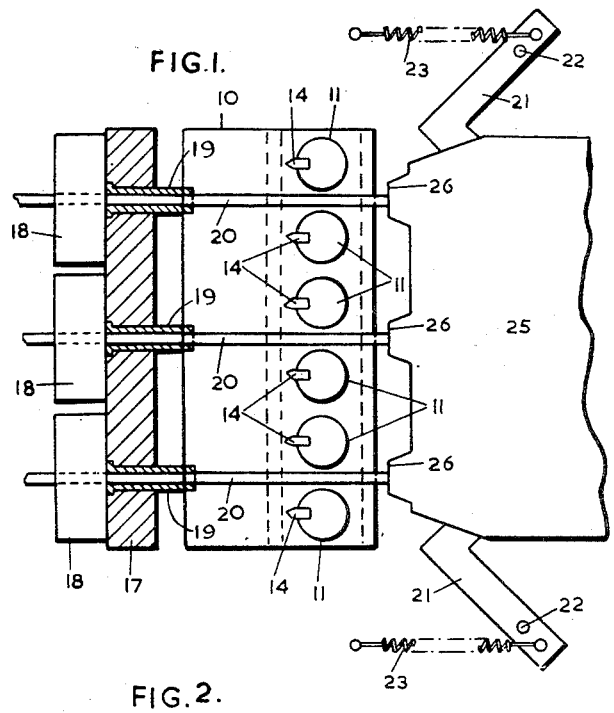
Figs. 1–3 are diagrammatic fragmentary plan views of a draw-bench and cutter attachment, showing different positions of the mechanisms.

Referring to Figs. 1 to 5, the cutter attachment comprises a box-like housing 10 which houses six cutter spindles 11, disposed vertically and journalled in top, centre and bottom bearing plates 12 (Fig. 4) afforded by the housing 10, so that the spindles 11 are well reinforced against lateral thrust.

The six spindles 11 are rotatably interconnected by meshing gear wheels 13 at their upper ends, and thus consist of three pairs of counter-rotating spindles, the three pairs comprising the two adjacent centre spindles, and each of the two adjacent spindles at the respective outer ends of the housing 10.

Each spindle 11 carries a cutter blade 14 which projects radially therefrom with its cutting edge disposed vertically, and all the cutter blades 14 are in the same horizontal plane. The pair of blades 14 carried by each pair of counter-rotating spindles 11 co-act with each other, i. e. each pair of co-acting cutter blades reach a position of confronting edge-to-edge relationship during each revolution of the spindles (see Fig. 3). All three pairs of cutter blades reach said position at the same time.

The housing 10 is mounted on the draw-bench side frames 15 so as to be slidable horizontally and longitudinally, within limits, in guides 16.

The cutter attachment is located in front of the die-plate 17 (Figs. 1 to 3), which supports three dies 18 in a horizontal row, the arrangement being such that each work-piece is drawn through a die 18 and a guide 19, and the drawn work-piece 20 passes between a pair of cutter blades 14.

The limits of the rearward sliding movement of the cutter attachment is thus limited by the die plate 17, whilst its forward sliding movement is limited by stops in the form of a pair of inwardly projecting arms 21, one at each side of the draw-bench. These arms 21 define a fully forward position of the cutter attachment housing 10, but can pivot rearwardly about vertical axes 22 (Figs. 1 and 5) and against loading springs 23, for a purpose set out below.

An endmost cutter spindle 11 extends upwardly and is provided with a handle 24 whereby all the intergeared spindles 11 may be rotated.

Fig. 1 illustrates a starting position, in which the cutter attachment has been moved rearwardly along its guides to a position close to the die-plate 17, with the result that the forward ends of the work-pieces 20 protrude well forward of the housing 10 of the attachment and are readily available to the dogging wagon 25. The latter, in order that its jaws 26 may be secured to the work-pieces 20 must pass the above-mentioned stops 21 for the housing 10, which stops are pivoted rearwardly against the action of the springs 23 by the dogging wagon, as seen in the drawing. The stops 21 return automatically to their operative positions shown in Figs. 2, 3 and 5 as soon as the dogging wagon has moved away from the die-plate 17 on its working travel.

Figure 2:
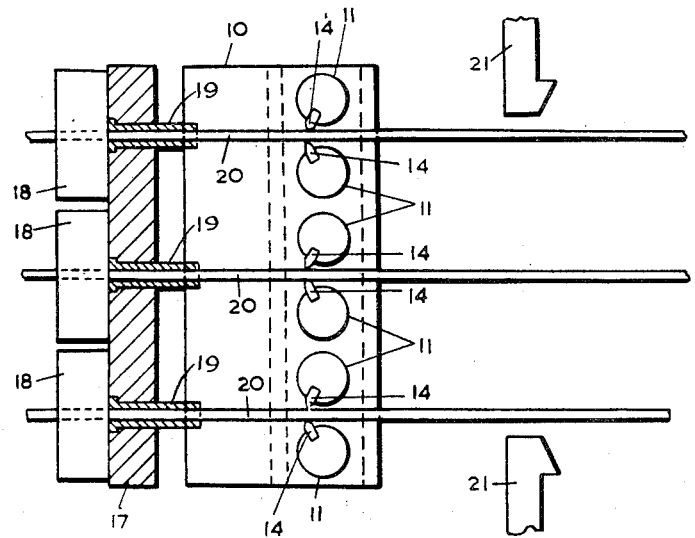

When the three work-pieces 20 have been drawn to a desired length, an operative rotates the cutter spindles 11 by means of the handle 24, to cause each pair of cutter blades 14 to engage opposite sides of the work-piece 20 passing between them and commence a cut, the blades 14 being inclined against the direction of draw, all as shown in Fig. 2 of the drawings.

Figure 3:
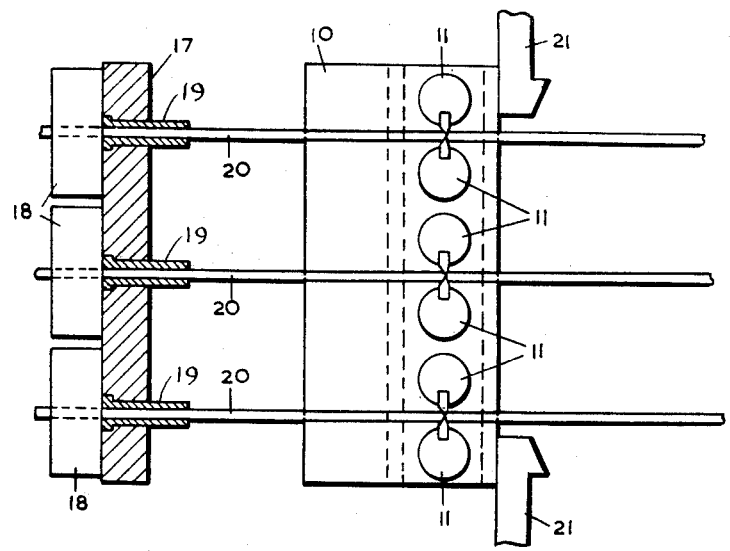

From the position shown in Fig. 2, the cutter attachment is carried forward bodily in its guides by the moving work-pieces until it encounters the stops 21, as seen in Fig. 3, whereupon the continued drawing movement of the work-pieces causes the cutter blades 14 and spindles to rotate in the direction of draw until each pair of blades reaches its position of confronting edge-to-edge relationship shown in Fig. 3, and effects the cutting off of the drawn length.

Obviously, the drawn lengths will sever when the tensile stress imparted by the drawing process becomes greater than the progressively reducing cross-section of the work-piece, at the point of cut, can withstand.

Figure 4:
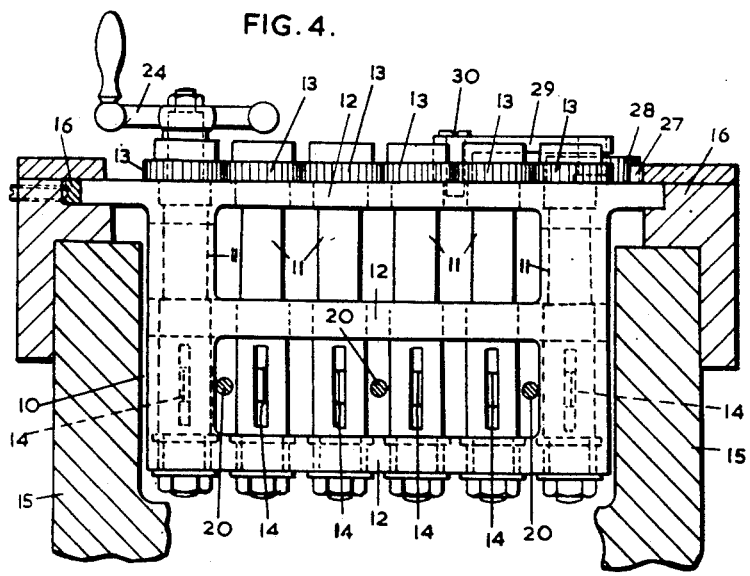
Fig. 4 is a front elevation of a cutter attachment.
Figure 5:
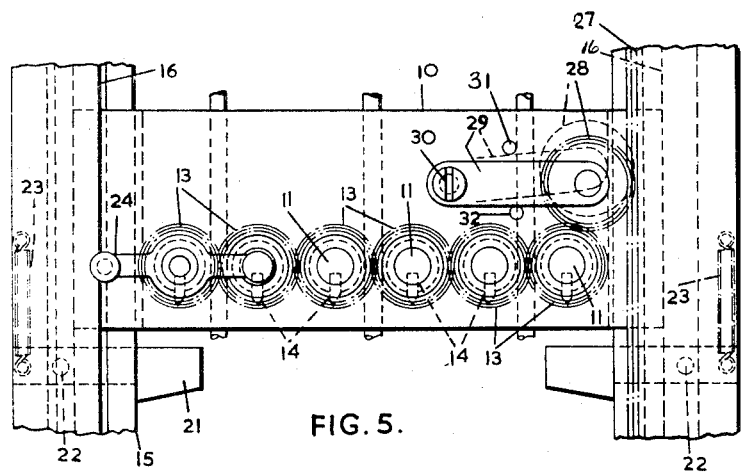
Fig. 5 is a plan view of Fig. 4.

The spindles 11 and cutters 14 can be rotated further in the same direction by means of the handle 24, back to the starting position, but in this connection in addition to this manual control, there is shown in Figs. 4 and 5 a mechanism which comes into operation automatically to effect the necessary rotation of the spindles 11 when the cutter attachment is moved rearwardly. Said mechanism comprises a longitudinally disposed rack 27 forming part of one of the guideways 16 for the cutter attachment housing 10, and the housing 10 carries a pinion 28 rotatably mounted on the free end of a transverse radius arm 29, pivotally mounted on the top plate of the housing 10 at 30, the arrangement being such that the pinion 28 is in constant mesh with the rack 27, but by pivotal movement of the radius arm between stops 31, 32, can be brought into and out of mesh with the gear 13 on the endmost spindle 11. Thus, when the cutter attachment is moving rearwardly bodily, the arm 29 is constrained to pivot forwardly until the stop 32 is encountered, and this forward pivoting meshes the pinion 28 with the said gear 13, as seen in full lines in Fig. 5, to rotate all the spindles 11 and return the cutters 14 to the starting position. During forward movement of the cutter attachment, however, the arm 29 pivots rearwardly until the stop 31 is encountered, and the pinion 28 is thereby disengaged from the gear 13, this position being shown in chain lines in Fig. 5.

In the embodiment above described, the cutter blades 14 are brought into operation manually by means of the handle 24, but in an alternative arrangement (not shown) this is effected automatically, as when it is desired to produce standard drawn lengths, by arranging for the dogging wagon to operate a mechanical linkage or a remote control element at a predetermined point in its working travel, which operation actuates a suitable mechanism for effecting the necessary forward rotation of the cutter blades into engagement with the work-pieces, so as to sever them as above described.

Also, in the described embodiment there are three work-pieces and dies in a horizontal row, and three pairs of cutter blades on six vertical spindles, but it will be appreciated that this arrangement can be varied within the scope of the present invention.

Figure 6:
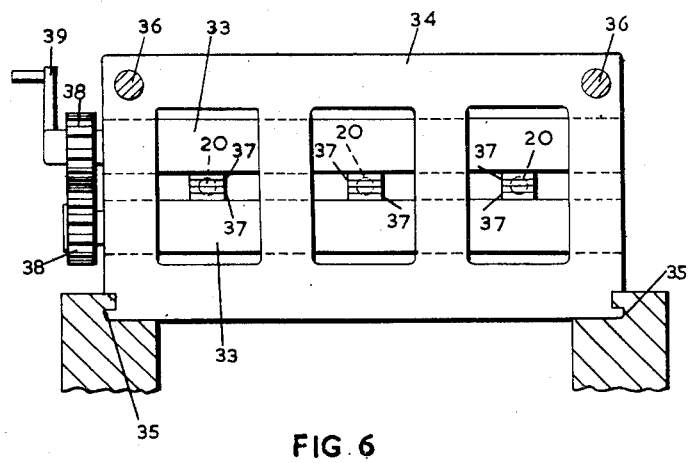
Fig. 6 is a diagrammatic front elevation of a modified cutter attachment.

In the alternative construction shown diagrammatically in Fig. 6, for the same three work-pieces 20 there are only two spindles 33 disposed horizontally in a suitable housing 34, shown as slidable in guideways 35 and on guide rods 36, each spindle 33 carrying three blades 37 to provide three co-acting pairs of cutter blades. The spindles are geared together by gear wheels 38, and one spindle is provided with a handle 39.

There may be both horizontal and vertical rows of dies and work-pieces, with a corresponding number of pairs of cutter blades on either vertical or horizontal spindles, within the limits of practicability.

Having fully described my invention, what I claim and desire to secure by Letters Patent is:

1. A device for severing lengths of drawn stock comprising a support, a housing on said support, at least one pair of parallel spindles journalled in said housing, means coupling said spindles together for counter-rotation relative to each other, means for rotating said spindles, at least one pair of cutter blades mounted one upon each spindle, disposed longitudinally of said spindles and constituting a pair of coacting blades which reach a position of confronting edge-to-edge relationship during each revolution of the spindles, longitudinal slideways on said support, means on said housing engaging in said slideways whereby the housing is slidable in opposite directions in said slideways, and stop means on said support defining a positively located position of said housing in said slideways.

2. A device for severing lengths of drawn stock comprising a support, a housing on said support, at least one pair of parallel spindles journalled in said housing, means coupling said spindles together for counter-rotation relative to each other, means for rotating said spindles, at least one pair of cutter blades mounted one upon each spindle, disposed longitudinally of said spindles and constituting a pair of co-acting blades which reach a position of confronting edge-to-edge relationship during each revolution of the spindles, longitudinal slideways on said support, means on said housing engaging in said slideways whereby the housing is slidable in opposite directions in said slideways, stop means on the support defining a positively located position of said housing in its guides, said stop means comprising a pair of horizontally disposed arms, one at each side of the support, which project inwardly into the path of movement of the housing and are pivotally mounted to swing toward said housing, spring means being provided to urge said stops into their inwardly projecting positions.

3. A device for severing lengths of drawn stock comprising a box-like housing having an open front and rear, an even number of vertically disposed spindles journalled side-by-side in said housing, a gear wheel on each spindle, which gear wheels intermesh and couple the row of spindles together as counter-rotating pairs of spindles, manual operating means for rotating said intergeared spindles, a cutter blade on each spindle disposed longitudinally and projecting radially therefrom, the two cutter blades of a pair of spindles constituting a pair of co-acting blades which reach a position of confronting edge-to-edge relationship during each revolution of the pair of spindles, longitudinal slideways on the support, guide ribs on said housing engaging said slideways whereby the housing is slidable rearwardly and forwardly, and rearwardly retractable stop means on the support defining a positively located fully forward position of said housing in its slideways.

4. A device for severing lengths of drawn stock comprising a box-like housing open at front and rear, an even number of vertically disposed spindles journalled side-by-side in said housing, a gear wheel on each spindle, which gear wheels intermesh and couple the row of spindles together as counter-rotating pairs of spindles, manual operating means for rotating said intergeared spindles, a cutter blade on each spindle disposed longitudinally and projecting radially therefrom, the two cutter blades of a pair of spindles constituting a pair of co-acting blades which reach a position of confronting edge-to-edge relationship during each revolution of the pair of spindles, longitudinal slideways on the support, guide ribs on said housing engaging said slideways whereby the housing is slidable rearwardly and forwardly, a longitudinal rack on the support adjacent a slideway for the housing, a transverse horizontal rock lever on said housing, a gear wheel carried by said rock lever, which gear wheel is in constant mesh with said rack so as to be rotated thereby during movement of said housing in its slideways, said rock lever operating to mesh said gear wheel with a gear wheel of one of said spindles upon rearward movement of the housing and to unmesh said gear wheels upon forward movement of the housing whereby the spindles are rotated during said rearward movement, rearwardly retractable stop arms on the support operative to engage and define a positively located fully forward position of said housing in its slideways, and spring means urging said stop arms to housing engaging positions.

References Cited in the file of this patent

UNITED STATES PATENTS

| | | |
|---|---|---|
| 344,819 | Eckerson | July 6, 1886 |
| 773,561 | George | Nov. 1, 1904 |
| 936,572 | Scott | Oct. 12, 1909 |
| 1,970,205 | Thyssen | Aug. 14, 1934 |
| 2,348,491 | O'Malley et al. | May 9, 1944 |
| 2,618,335 | Price | Nov. 18, 1952 |
| 2,670,796 | Orr | Mar. 2, 1954 |
| 2,703,614 | Bottenhorn | Mar. 8, 1955 |

FOREIGN PATENTS

| | | |
|---|---|---|
| 513,639 | Germany | Dec. 1, 1930 |